United States Patent [19]

Komanduri et al.

[11] Patent Number: 4,515,047
[45] Date of Patent: May 7, 1985

[54] DYNAMICALLY STIFFENED ROTARY TOOL SYSTEM

[75] Inventors: Ranga Komanduri; Robert H. Ettinger, both of Schenectady; Morton P. Casey, Jr., West Sand Lake; William R. Reed, Jr., Schenectady, all of N.Y.

[73] Assignee: General Electric Company, Schenectady, N.Y.

[21] Appl. No.: 489,436

[22] Filed: Apr. 29, 1983

[51] Int. Cl.³ ............................ B23B 1/00; B26D 1/12
[52] U.S. Cl. ............................................ 82/1 C; 407/7
[58] Field of Search ............... 82/1 C, DIG. 9; 407/7

[56] References Cited

U.S. PATENT DOCUMENTS

| 543,551 | 7/1895 | Hartness | 407/7 |
| 2,233,724 | 3/1941 | Bannister et al. | 29/103 |
| 2,513,881 | 7/1950 | Low | 29/103 |
| 2,689,498 | 9/1954 | Johnson | 82/18 |
| 2,885,766 | 5/1959 | Ernst et al. | 29/105 |
| 3,329,065 | 7/1967 | Vaughn | 90/11 |

FOREIGN PATENT DOCUMENTS 28779  3/1977  Japan ..................................... 407/7

Primary Examiner—Leonidas Vlachos
Attorney, Agent, or Firm—Leo I. MaLossi; James C. Davis, Jr.; James Magee, Jr.

[57] ABSTRACT

A dynamically stiffened rotary tool construction is disclosed. The preferred stiffening means are a pair of spaced, adjustable, rotatably-mounted cam followers.

5 Claims, 9 Drawing Figures

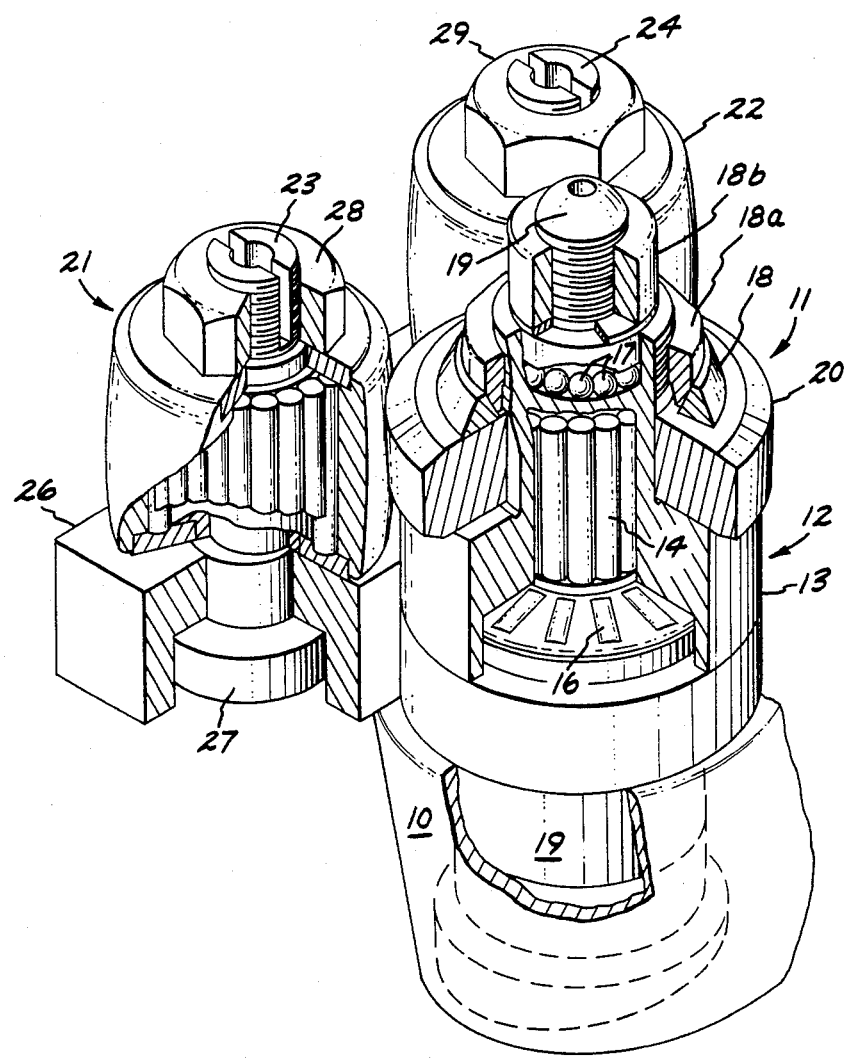

DYNAMICALLY STIFFENED ROTARY TOOL SYSTEM

BACKGROUND OF THE INVENTION

This invention relates to improvements in rotary cutting tool structures for both turning and milling operations.

Rotary tool machining, in principle, uses a tool insert of circular shape mounted on a shaft held in bearings, both radial and thrust, to facilitate rotation thereof about its central axis. The tool can be self-propelled by the cutting action or can be driven externally.

Representative rotary tool constructions are disclosed in U.S. Pat. No. 2,233,724—Bannister, et al.; U.S. Pat. No. 2,513,881—Low; U.S. Pat. No. 2,689,498—Johnson; U.S. Pat. No. 2,885,766—Ernst, et al. and U.S. Pat. No. 3,329,065—Vaughn.

As is well recognized in this prior art, rotary tool machining offers significant advantages in that, because the cutting element rotates relative to the work, any given point on its peripheral cutting edge engages the workpiece for only a short interval of time and then moves on. As a result, the tendency of the cutting edge to heat up is greatly reduced, the tool life is extended and the cutting function is retained for a longer period of time. Extending the tool life lengthens the cutting time available between cutting insert changes.

In spite of the fact that rotary tool machining was introduced over one hundred years ago, the systems produced and proposed to date all lack adequate rigidity during the cutting operation. This inadequate dynamic rigidity results in chatter of the rotary tool holder, rapid chipping of the tool edge and accelerates wear in the bearing system. In the extreme case it may be necessary to stop the machining. The limited commercial use evident since the introduction of such tools is believed, at least in part, to be due to lack of a rigid rotary tool system. The problem of chatter addressed by this invention is particularly evident in the machining of difficult-to-machine materials, such as titanium alloys, nickel-base superalloys (e.g. Inconel 718) and hardened alloy steels (e.g. AISI 4340), which cause shear localization in the chips and large amplitude of forced oscillation (resulting in chatter) in the cutting process.

A wide variety of tool materials may be utilized in the practice of this invention. Such tool materials would include cemented carbides such as straight WC and multi-carbides in a cobalt binder, TiC in a Ni-Mo binder and coated carbides and ceramic materials such as alumina, mixtures of alumina with TiO, $ZrO_2$ and/or TiC, and mixtures of silicon nitride with TiC, $Al_2O_3$, $Y_2O_3$.

DESCRIPTION OF THE INVENTION

In accordance with this invention, the rotary cutting tool construction, which usually comprises in combination a spindle mounted in a tool shank, a cutting disc assembly (including the cutting disc) rotatably mounted on the spindle and anti-friction bearing means disposed between the spindle and the cutting disc assembly, is provided with rotatable means for dynamically stiffening the spindle. The dynamic stiffening means are (or is) adjustably supported on the tool shank adjacent the cutting disc assembly in which position the dynamic stiffening means can be pre-set to apply a desired resultant biasing force to the cutting disc assembly. The preferred dynamic stiffening means comprises a pair of spaced, adjustable, rotatably-mounted bearings known as cam followers.

The best positioning for these cam followers places one cam follower in contact with the cutting disc assembly on either side of and substantially equidistant from a line extending diametrically through the cutting disc from the cutting area. The cutting disc (and thereby the cutting disc assembly) is propelled by the component of force tangential to the cutting disc acting at the radius thereof. Utilization of a pre-set bias by having the cam followers so positioned before cutting is initiated as to exert force against the cutting disc assembly provides the additional benefit of reducing the speed of rotation of the cutting disc extending tool life and compensating for wear of bearings in the rotary tool system thereby maintaining stiffness over a prolonged period of use.

BRIEF DESCRIPTION OF THE DRAWINGS

The features of this invention believed to be novel and unobvious over the prior art are set forth with particularity in the appended claims. The invention itself, however, as to the organization, method of operation and objects and advantages thereof, may best be understood by reference to the following description taken in conjunction with the accompanying drawing wherein:

FIG. 3 is an enlarged view partially cut away to show the interrelation between the rotary cutting disc assembly and dynamic stiffening means of this invention;

FIG. 7 gives results from the turning of In 718 and FIG. 8 gives results from the turning of Titanium 6Al-4V alloy.

MANNER AND PROCESS OF MAKING AND USING THE INVENTION

Figure 1:
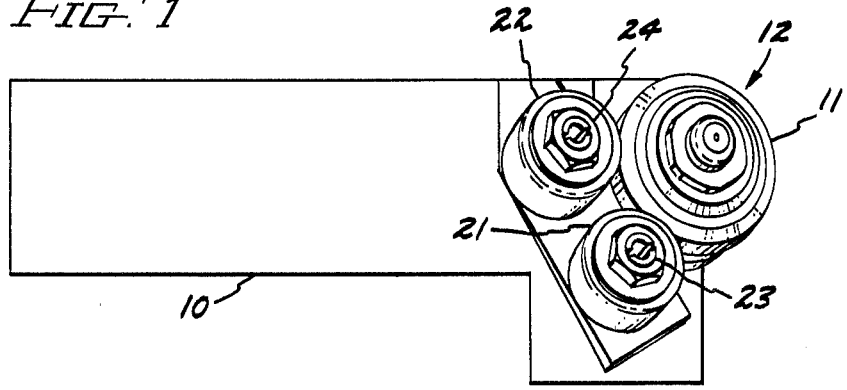
FIG. 1 is a schematic view in plan of the rotary tool construction of this invention.
Figure 2:
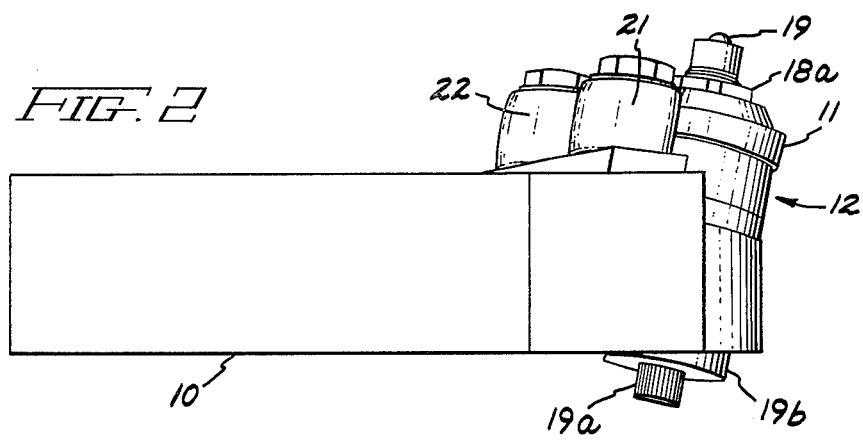
FIG. 2 is a schematic elevational view of the structure of FIG. 1.

Referring now to FIGS. 1, 2 and 3, the modified rotary tool construction of this invention includes a tool shank 10, one end of which is adapted to be secured in a tool post, or other support, of a machine tool so that the opposite end of shank 10 can present the cutting disc 11 into machining contact with a workpiece. Cutting disc 11 is part of cutting disc assembly 12, which typically comprises, in addition to disc 11, a housing 13, needle bearings 14, thrust bearings 16 and ball bearings 17. This assemblage of parts (in addition to one or more retaining washers 18, nut 18a and threaded collar 18b) fits over and around, and is supported by, spindle 19. Spindle 19 in turn is supported by tool shank 10, being held in place by fastener 19a (extending upwardly through the underside of shank 10 into engagement therewith) and spacer 19b. It may be readily seen that spindle 19 is stationary, while the several bearing mounts render cutting disc 11 and housing 13 freely rotatable relative thereto.

Metal cutting is accomplished by the upper circular peripheral edge 20 of disc 11. Preferably, the cutting portion of disc 11 is presented to the workpiece at a negative rake angle to provide the advantages of reduced chipping of the cutting edge and reduced rotational speed of cutting disc 11. The axis of rotation of cutting disc 11 is at an angle to the vertical such that the cutting edge 20 of the tool engages the work much as an ordinary single point tool would. Cutting disc 11 is caused to rotate by the component of force tangential to disc 11 acting at the radius thereof. Rotation of the disc is a function of the work velocity and the side rake angle of disc 11.

Although the description of this invention directs attention to self-propelled rotary tools, it is equally applicable to rotary tools that are driven externally.

As disc 11 is rotated, successive portions of edge 20 contact the workpiece, each for a short interval of time during which stock is removed from the workpiece. It is this short exposure to the work function for each increment of edge 20 that reduces the tendency of the edge to heat up and be prematurely worn or damaged.

The pair of cam followers 21, 22 mounted for free rotation on eccentrically mounted, repositionable shafts 23, 24 are disposed spaced from each other a short distance such that a line extending diametrically from the cutting area passes therebetween. Location of these dynamic stiffening means is optimum, when the resultant force exerted thereby most directly opposes the action of the cutting force acting on disc 11. Shafts 23, 24 projecting off-center from supporting cylindrical bases extend upwardly through support bracket 26 which, in turn, is firmly fixed to tool shank 10 by fasteners (not shown) extending upwardly from the underside of shank 10 to engage it. By rotating the cylindrical bases (e.g. base 27) in their sockets formed in the underside of bracket 26, the shafts and cam followers can be moved toward or away from assembly 12. The eccentric offset of the shaft will be determined by the tool design as long as provision is made for adjustability.

Cam followers 21, 22 are brought into contact with the degree of pre-loading desired by adjusting the location of shafts 23 and 24, which are oriented with their central axes substantially parallel to the axis of spindle 19. Cam follower bearings are available commercially with integral eccentric studs or, as shown herein, without studs for shaft mounting. Either construction is available with crowned outer diameter (i.e. with a slight barrel shape). In tests conducted with the construction shown in FIGS. 1, 2 and 3, the cam followers were pre-loaded before cutting was initiated. These cam followers had the design capability of withstanding up to 1660 pounds of dynamic radial force. The contact of cam followers 21, 22 at the outer periphery thereof with the cutting disc assembly was along a circle on disc 11 a short distance below edge 21 so that the net load encountered during machining to cause deflection of spindle 19 could be minimized. Once positioned, the cam followers are kept in place by tightening nuts 28, 29.

The beneficial effect of the introduction of these means for dynamic stiffening of spindle 19 is demonstrated by the following tests, which produced the results displayed in FIGS. 4–8.

An Inconel 718 (solution treated and aged, $R_c42$) workpiece (6" diameter) was mounted on a 15 h.p. Lodge and Shipley lathe. Straight cemented tungsten carbide (C-2 grade) circular cutting discs (1.062" in diameter with a $-15°\times0.060"$ chamfer) were used in these tests. The cutting conditions with and without the cam followers were the same. Cutting speed was maintained constant at 150 surface feet per minute (SFPM). Feeds were varied from 0.005 to 0.041 in/rev and depths of cut ranging to 0.050" were used. All tests were conducted with the carriage carrying the cutting disc assembly moving to the left as the workpiece is machined with the chip flowing over the upper surface of the cutting disc and the rotation of the workpiece being clockwise viewed from the end thereof toward which the carriage is moving. Cutting forces were monitored using a commercial three-component piezoelectric dynamometer. Surface finish of the work material was determined using a portable stylus-type instrument (Taylor-Hobson Surtronic). Cutter wear was measured periodically in an optical microscope. The back rake angle of the cutter in all of the tests was $-5°$ and the side rake angle was varied from $-5°$ to $-40°$. The cutting fluid used was Cimfree 238 (25:1).

Cam followers, when used, contacted the cutting disc at spaced points on the disc defining an arc therebetween of about 60° and were pre-loaded. Without cam followers chatter of the cutting disc assembly was experienced instantaneously and was accompanied by large amplitude variations in the dynamic components of force as shown by the traces on the lefthand side of FIG. 4. As will be evident from FIG. 4, FIG. 5A and FIG. 6 (top) vibration, noise and surface roughness all resulted, when cam followers were not employed. When cam followers were employed as dynamic stiffening means, the cutting action was smooth, without chatter and with very small variations in the dynamic components of force. The force traces for feed, radial and tangential force components shown in FIG. 4 (righthand side) illustrate the marked improvement obtained.

Figure 6:
FIG. 6 is a photographic comparison of the chips formed in the machining of In 718 without (top) and with (bottom) the improvement of this invention and FIGS. 7 and 8 are graphic comparisons of uniform flank wear occurring as a function of cutting time between a stationary tool and a rotary cutting tool dynamically stiffened by the use of this invention.
Figure 4:
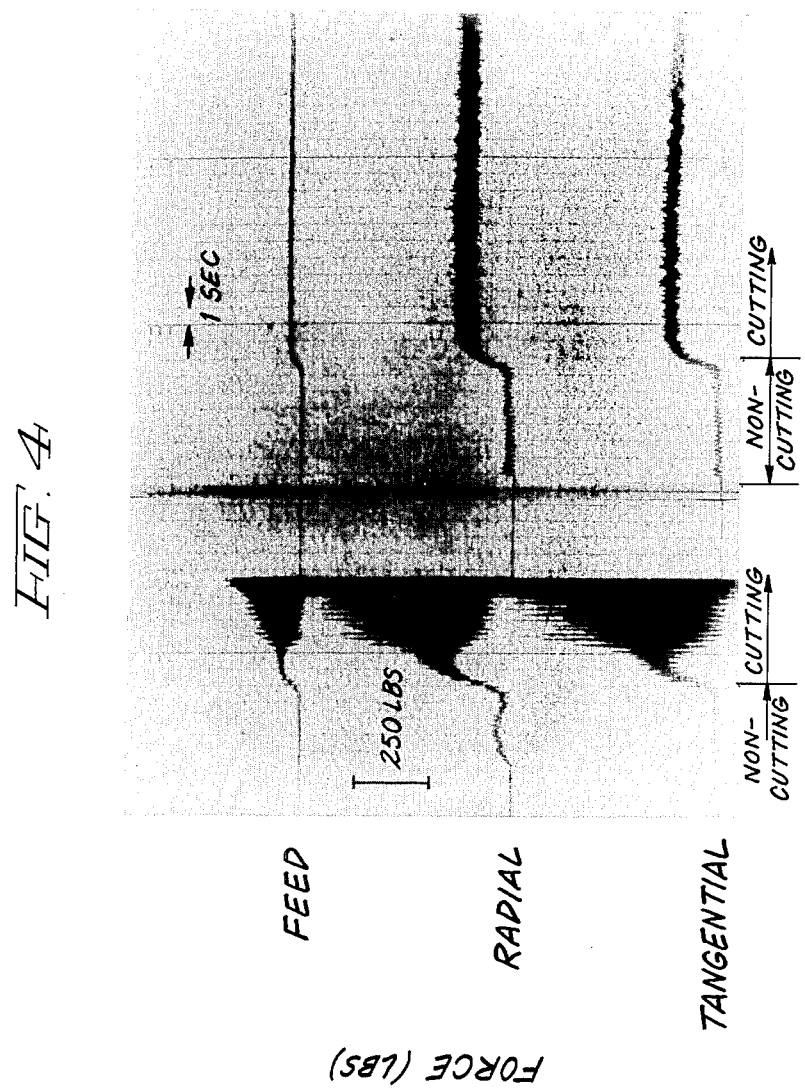
FIG. 4 is a photograph displaying a comparison of amplitude force fluctuation in the rotary tool machining of In 718 without (on left) and with (on right) the improvement of this invention.
Figure 5A:
FIGS. 5A and 5B are photographs showing the resultant surface when rotary tool machining In 718 without (FIG. 5A) and with (FIG. 5B) the improvement of this invention.
Figure 5B:
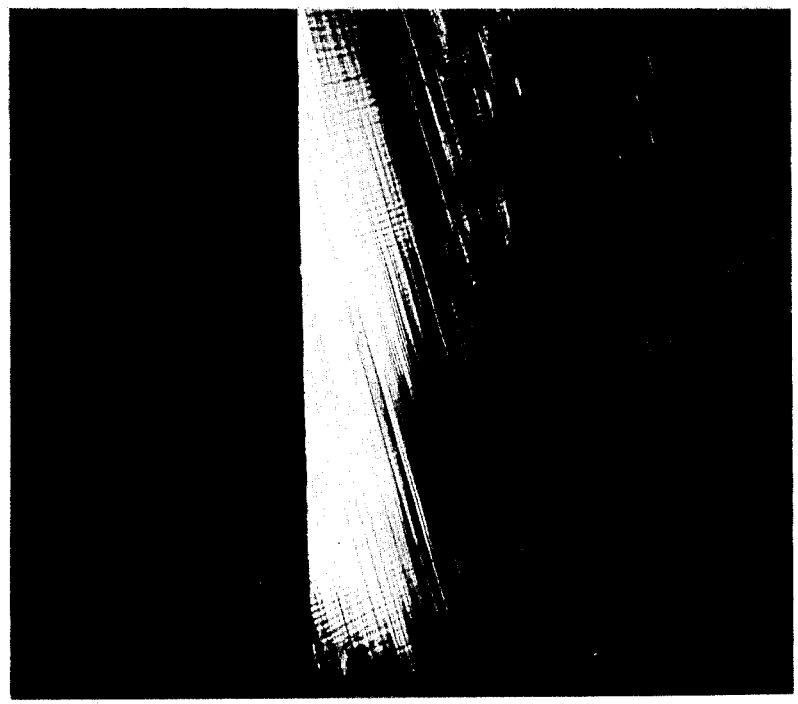

Thus, a photograph of the workpiece after machining with the rotary tool without the benefit of dynamic stiffening (FIG. 5A) shows the resulting chatter marks and surface roughening. In contrast thereto, in FIG. 5B, the photograph of the workpiece machined with the rotary turning tool provided with dynamic stiffening according to this invention, displays a substantially vibration-free smooth surface. As may be seen in FIG. 6, even the shape of the chips leaving the cutting disc 21 with and without the benefit of dynamic stiffening was found to be different. Severe triangulation of chips occurred under vibratory (non-dynamically stiffened) conditions. An example of this type of chip is shown at the top of FIG. 6. The continuous chip shown at the bottom of FIG. 6, which displays minimal triangulation, resulted from rotary tool machining in which the cutting system received the benefit of dynamic stiffening (i.e. by the cam followers).

The data obtained during this investigation establish, thereby, that chatter of the rotating cutting disc assembly during the machining of difficult-to-machine materials can be controlled by introducing suitable dynamic support utilizing the means disclosed herein or equivalents thereof.

In addition to the tests reported hereinabove, machining tests were also conducted on the same 15 h.p. Lodge and Shipley lathe using a titanium 6Al-4V ($R_c36$) workpiece 6 inches in diameter. The cutting speed was maintained constant at 200 SFPM and the other cutting conditions were the same as for the In 718 tests reported above. Data reflecting tool life were collected for both In 718 and the titanium alloy and are reported in FIGS. 7 and 8.

Figure 7:
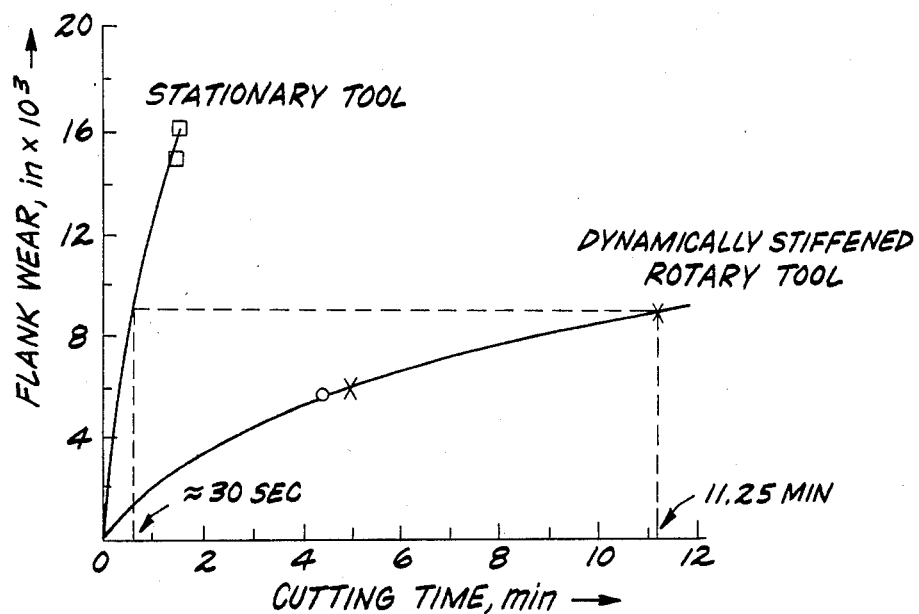

FIG. 7 shows the progression of uniform flank wear (UFW) with cutting time during the machining of In 718 with a stationary tool and with a rotary turning tool provided with dynamic stiffening according to this invention. The conditions specific to this test run were the following: depth of cut—0.025"; feed—0.041 in/rev; material removal rate—1.845 in$^3$/min. Under the conditions of cutting employed, FIG. 7 shows that whereas the flank wear of the stationary tool reached approximately 0.016" during about 1.5 minutes of use, the dynamically stiffened rotary tool exhibited wear of only about 0.009" after 11.25 minutes. Further, comparing the times at which the two tools exhibited the same amount of wear (about 30 seconds for the stationary tool versus 11.25 minutes for the rotary tool) we arrive at a performance improvement of over 20.

Figure 8:
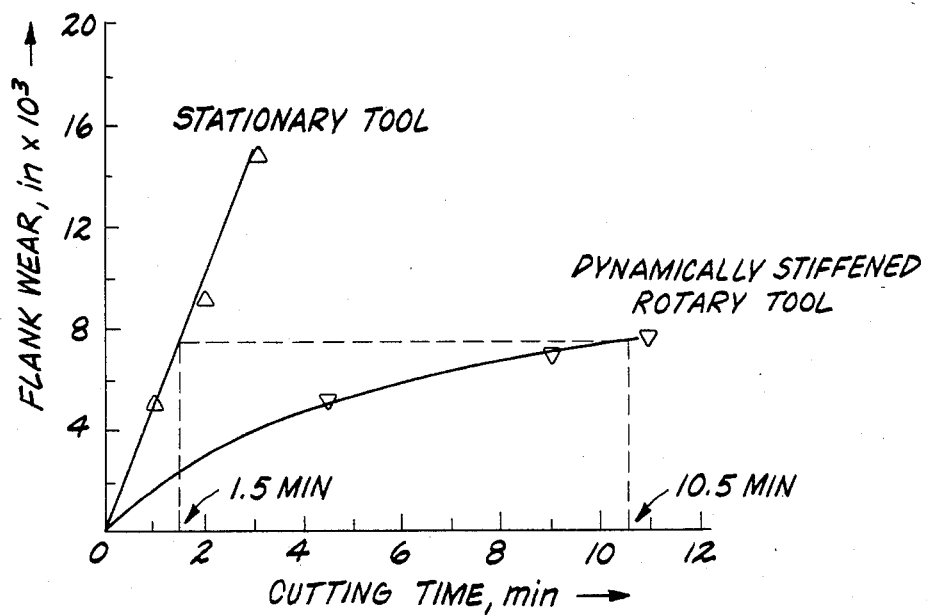

FIG. 8 shows the progression of UFW with cutting time when machining the titanium alloy in the same manner as described in connection with FIG. 7, save for the specific cutting conditions. Thus, in the case of the titanium alloy, the cutting conditions were as follows: depth of cut—0.050"; feed—0.041 in/rev; material rate of removal—about 5 in$^3$/min. Again, the improvement in performance with the stiffened rotary tool is about 7. The wear rate with the stationary tool in this case was slightly less, reaching a value of 0.015" after about three minutes; with the rotary tool the wear was about 0.007" after machining for about 10½ minutes. In the machining of both the In 718 and the titanium alloy, the surface finish of the workpiece, after rotary tool turning, was very good (i.e. in the range of 75 to 150 microinches).

Thus, it has been determined that by applying dynamic stiffening means according to this invention to a rotary cutting disc assembly, stable cutting performance and low uniform wear are obtained along the cutting edge; even with very high feeds (up to 0.041 in/rev), the surface finish of the machined part remains of high quality and the stability of the cutting process does not decrease. Substantial tool life improvements have been seen.

What we claim as new and desire to secure by Letters Patent of the United States is:

1. In a rotary cutting tool construction comprising in combination a longitudinally-extending spindle affixed at one end thereof in a tool shank, a rotatable cutting disc assembly including a cutting disc mounted on said spindle and antrifriction bearing means disposed between said spindle and said cutting disc assembly, the improvement comprising rotatable means for dynamically stiffening said spindle, means mounted on said tool shank supporting said dynamic stiffening means for rotation adjacent said cutting disc assembly and in direct contact with said cutting disc for the application of at least one biasing force of preselected magnitude against said cutting disc.

2. The improvement recited in claim 1 wherein the rotatable dynamic stiffening means comprise a pair of spaced rotatable cam followers and said supporting means includes eccentric shafts mounting said cam followers with their axes substantially parallel to the axis of rotation of the spindle.

3. The improvement recited in claim 2 wherein each cam follower has a crowned outside diameter.

4. In the process of rotary tool machining in which a rotary tool having a rotatable cutting disc is mounted on stationary support means is presented into contact with a workpiece to remove material from the workpiece with succeeding portions of said rotating cutting disc, the improvement of applying at least one dynamic biasing force of predetermined magnitude directly against said cutting disc as it rotates to substantially directly oppose cutting forces applied to said cutting disc by the workpiece.

5. The improvement of claim 4 wherein the at least one biasing force comprises multiple forces applied to the cutting disc so that the resultant of the multiple forces acts substantially in opposition to the resultant of the cutting forces.

* * * * *